(12) United States Patent
Juan et al.

(10) Patent No.: US 7,907,982 B2
(45) Date of Patent: Mar. 15, 2011

(54) PORTABLE ELECTRONIC DEVICE (75) Inventors: Ching-Yang Juan, Taoyuan (TW); Yuh-Huei Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 766 days.

(21) Appl. No.: 11/638,524

(22) Filed: Dec. 14, 2006

(65) Prior Publication Data

US 2007/0155216 A1    Jul. 5, 2007

(30) Foreign Application Priority Data

Dec. 30, 2005  (TW) ............................. 94147645 A (51) Int. Cl.
*H04M 1/00* (2006.01)
(52) U.S. Cl. .................................. 455/575.4; 455/575.1
(58) Field of Classification Search ................ 455/575.4
See application file for complete search history.

(56) References Cited

U.S. PATENT DOCUMENTS

| 7,292,882 | B2* | 11/2007 | Lee et al. | 455/575.4 |
| 7,346,375 | B2* | 3/2008 | Sato et al. | 455/575.3 |
| 2005/0197173 | A1* | 9/2005 | Wee et al. | 455/575.4 |
| 2006/0094482 | A1* | 5/2006 | Takagi | 455/575.3 |
| 2007/0032278 | A1* | 2/2007 | Lee et al. | 455/575.4 |

FOREIGN PATENT DOCUMENTS

TW   M282434 U     12/2005
WO   WO-2006/006776 A1   1/2006

* cited by examiner

*Primary Examiner* — Zhiyu Lu
(74) *Attorney, Agent, or Firm* — Birch, Stewart, Kolasch & Birch, LLP (57) ABSTRACT

A portable electronic device at least includes a main body, a sliding cover, and an elastic assembly. The main body includes at least one sliding rod package. The sliding cover is disposed on the main body and is slidable between a closed position and a full-open position, and at least comprises one sliding rod. The sliding rods are slidably inserted into the sliding rod packages. The elastic assembly is connected to both the main body and the sliding cover to control the sliding cover at the closed position or the full-open position.

22 Claims, 9 Drawing Sheets

PORTABLE ELECTRONIC DEVICE

BACKGROUND OF THE INVENTION

1. Field of the Invention

The present invention relates to a portable electronic device, and in particular relates to a semi-automatic slidable electronic device.

2. Description of the Related Art

Portable devices such as mobile phones, smart phones, and personal digital assistants are typically divided into four types: all in one, flip cover, rotating cover, and sidekick-esque. The sidekick-esque portable devices have become increasingly popular in the consumer market, as users are able to open or close a sliding cover with only one hand, and the sliding cover is capable of being integrated with various operating interfaces.

Figure 1:
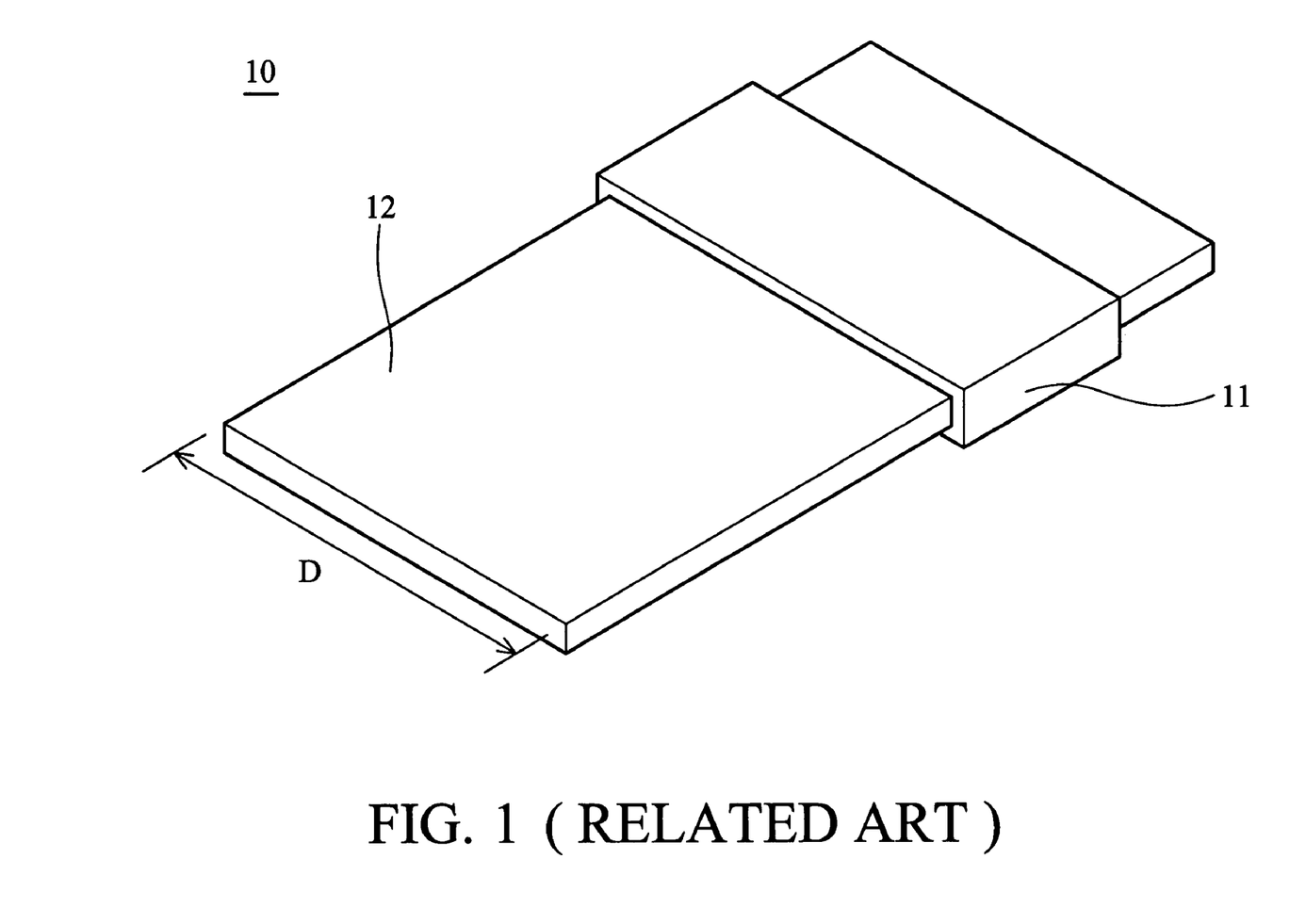
FIG. 1 is a perspective view of a conventional sliding mechanism.

The sliding cover of the conventional sidekick-esque portable device is connected by a sliding mechanism which is disposed respectively on a main body and a sliding cover, and moves between a closed position and a full-open position. FIG. 1 shows a conventional sliding mechanism 10, wherein a hinge 11 slides along a track 12. The disadvantage of the conventional sliding mechanism 10 is the width of span length D is too narrow to fit a sidekick-esque portable device or a sliding mechanism with big span length.

BRIEF SUMMARY OF THE INVENTION

The present invention provides an improved portable electronic device, and in particular an improved portable electronic device for a sidekick-esque sliding cover or a sliding cover with a big span length. An elastic assembly in the improved portable electronic device is further provided for assisting in the positioning of a sliding cover via an elastic force of the elastic assembly, which solves the problem of positioning deviation due to manual operation.

The portable electronic device comprises a main body, a sliding cover, and an elastic assembly. The main body comprises at least one sliding rod package. The sliding cover is disposed on the main body and slidable between a closed position and a full-open position on the main body, and at least comprises one sliding rod. The sliding rod is slidably inserted into the sliding rod package. The elastic assembly is connected to both the main body and the sliding cover to control the sliding cover at the closed position or the full-open position.

The elastic assembly further comprises a plurality of pogo pins, a pin fixture, and a plurality of fixing components, wherein the pogo pins comprise retractable pistons whose lengths are compressible due to externally applied forces. The elastic force of the elastic assembly is capable of stopping unintentional movement of the sliding cover at the full-open position or the closed position. When the sliding cover slides close to the full-open position or the closed position, the elastic force of the elastic assembly provides an auxiliary force assisting the sliding cover in automatically sliding to the full-open position and the closed position.

Another embodiment of the invention comprises an elastic assembly, which comprises at least one spring, a spring fixture, and a plurality of fixing components, wherein the spring is compressible such that the spring length is adjustable according to the externally applied force. The elastic force of the elastic assembly is capable of stopping unintentional movement of the sliding cover at the full-open position or the closed position. When the sliding cover slides close to the full-open position or the closed position, the elastic force of the elastic assembly provides an auxiliary force assisting the sliding cover in automatically sliding to the full-open position or the closed position.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
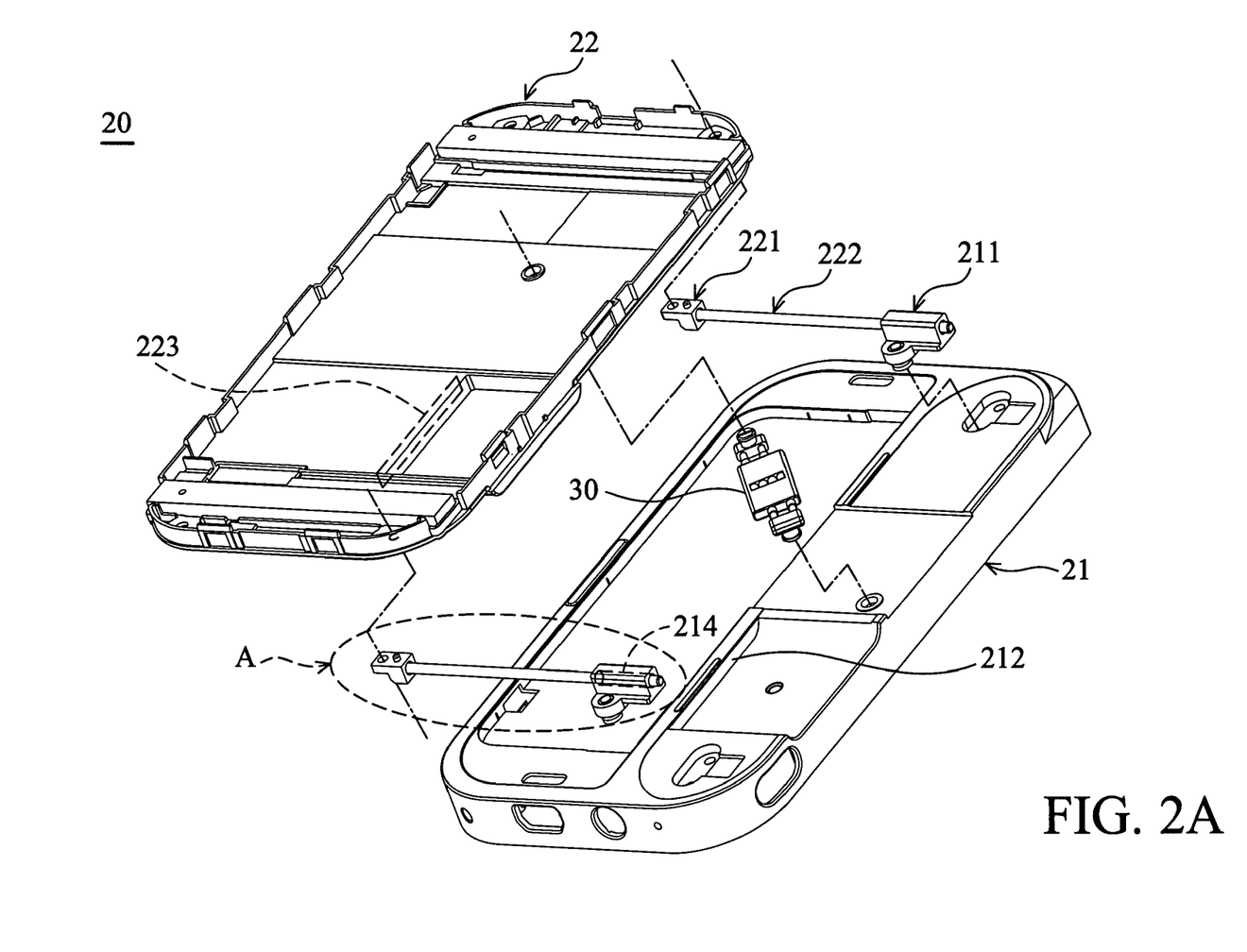
FIG. 2A is a perspective view of an embodiment of a portable electronic device.
Figure 2B:
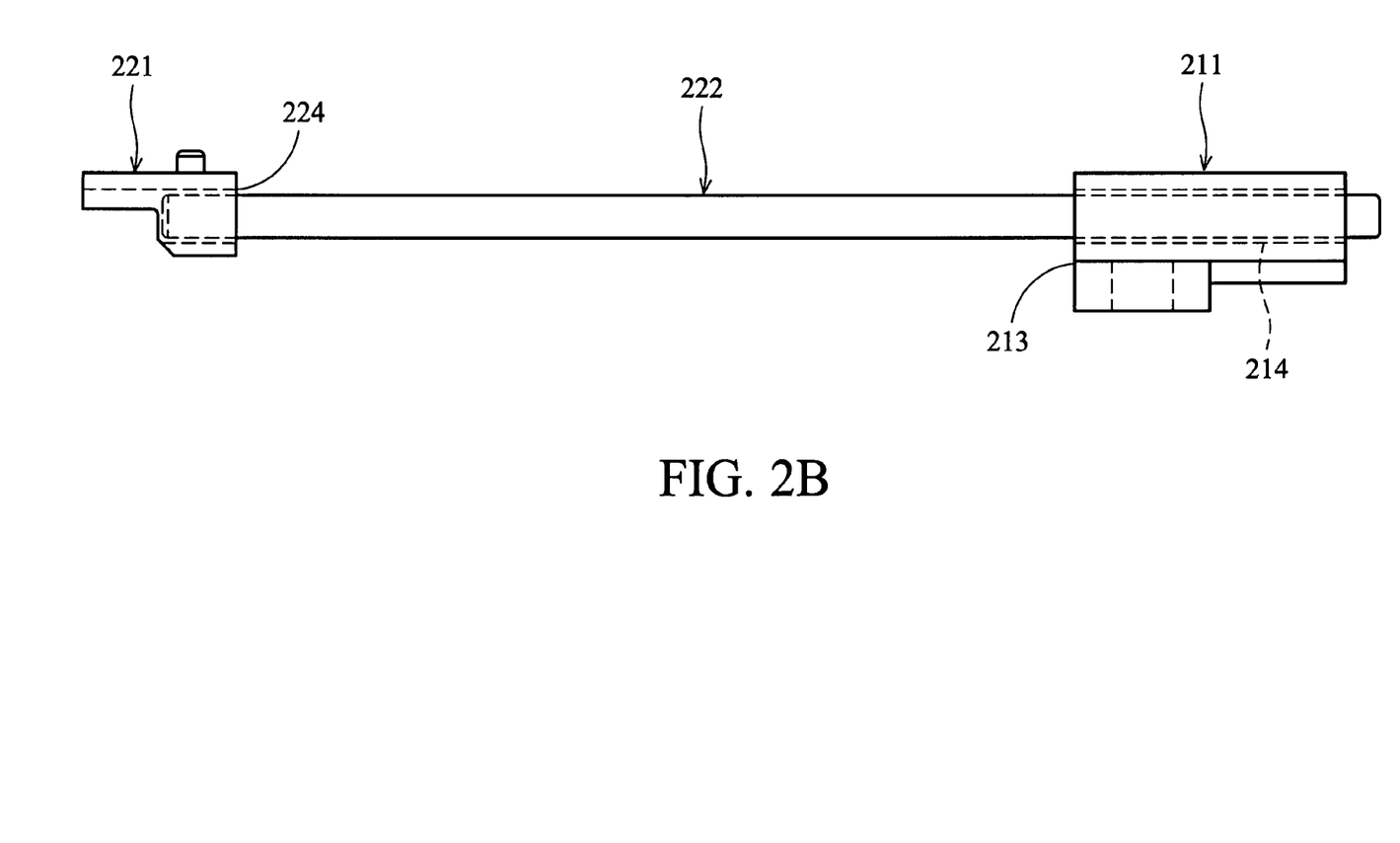
FIG. 2B is a side disposition view of a fixing stand, a sliding rod, and a sliding rod package of the portable electronic device in FIG. 2A.

Referring to FIG. 2A and FIG. 2B, FIG. 2A shows an embodiment of a portable electronic device 20 which comprises a main body 21, a sliding cover 22, and an elastic assembly 30.The main body 21 comprising two sliding rod packages 211 which are respectively disposed on a top side and a bottom side of the main body 21, a surface of the sliding rod packages 211 are made of a self-lubricating material which can be Polyoxymethylene. FIG. 2B shows the sliding rod packages 211 comprising a shaft hole 214 for insertion of a sliding rod 222.

The sliding cover 22 is disposed on the main body 21 and slidable between a full-open position (see FIG. 5A) and a closed position (see FIG. 6A), and comprises two sliding rods 222 and two fixing stands 221 corresponding to the locations of two sliding rod packages 211 on the top side and the bottom side of the sliding cover 22 and used to mount the sliding rods 222 on the sliding cover 22 in parallel. In order to restrain the sliding rods 222 to be mutually parallel, a distance between axes of the shaft holes 214 on the main body 21 is a constant, therefore the sliding cover 22 slides parallel to axes of the sliding rods 222, and a sliding direction of the sliding cover 22 on the main body 21 is parallel to an axis direction of the sliding rod 222. The surfaces of the sliding rods 222 are made of stainless steel with high surface finish which possesses anti-rust and low contact friction characteristics. Via adjusting the distance between the axes of the sliding rods 222, the invention is applicable to various sidekick-esque portable electronic devices or portable electronic devices with big span width.

The sliding cover 22 is slidable between the full-open position and the closed position, wherein the closed position is defined by a first restraint surface 212 on the main body 21 and a second restraint surface 223 on the sliding cover 22, and the full-open position is defined by a third restraint surface 213 on the sliding rod package 211 and a fourth restraint surface 224 on the fixing element 221. A detail description of the closed position and the full-open position are described in the following.

Figure 3:
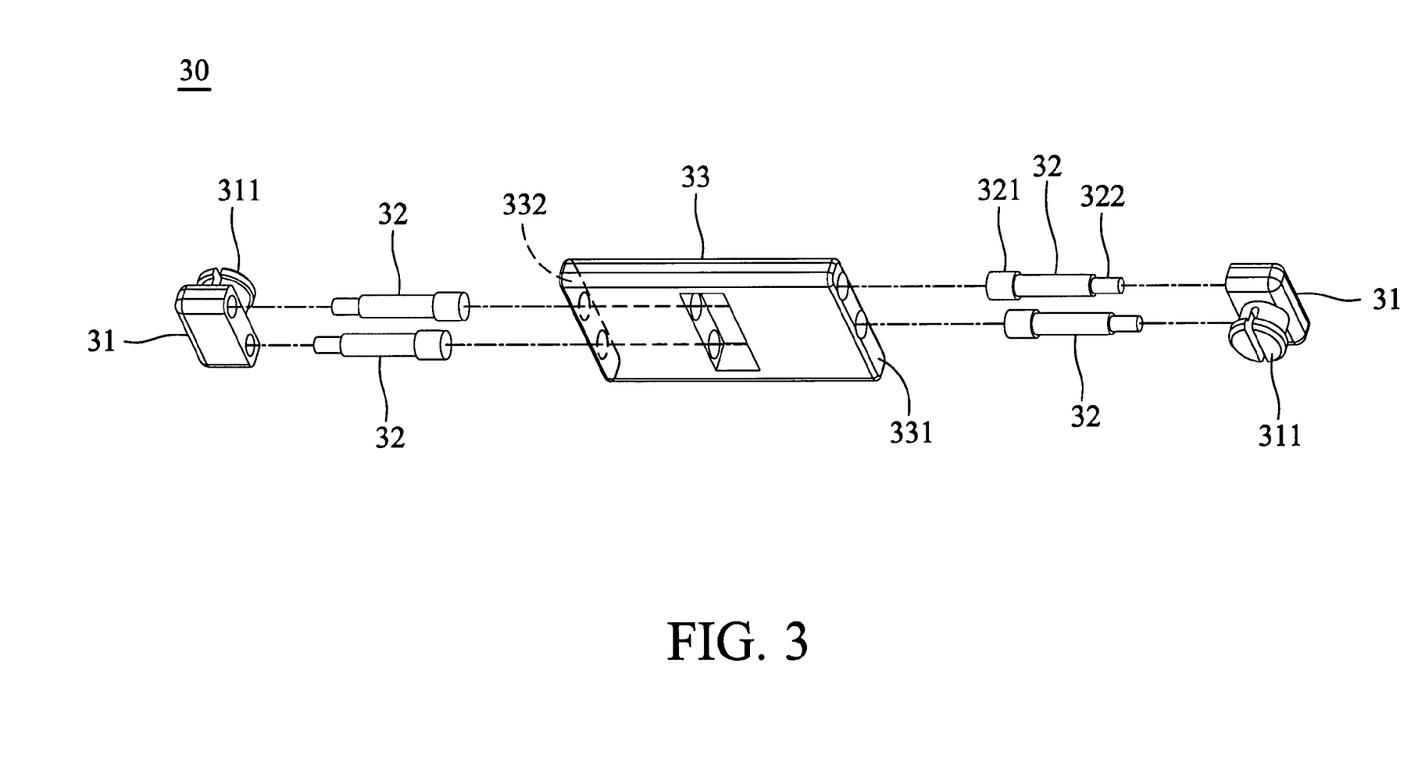
FIG. 3 is a perspective view of an elastic assembly in FIG. 2A.

Referring to FIG. 3, FIG. 3 shows the perspective view of the elastic assembly 30. The elastic assembly 30 is connected to the midst of both the main body 21 and the sliding cover 22 respectively. The elastic assembly 30 comprises two fixing components 31, four pogo pins 32, and a pin fixture 33, wherein the fixing component 31 comprises two fixing pins 311. The elastic assembly 30 is pivotally connected to the main body 21 and the sliding cover 22 via the two fixing pins 311. The pogo pin 32 comprises a base 321 and a retractable piston 322, wherein the retractable piston 322 is compressible such that the length is adjustable according to externally applied force. The pin fixture 33 comprises a first side 331 and a second side 332, wherein the numbers of the pogo pins 32 on the first side 331 and on the second side 332 are equivalent and the pogo pins 32 are assembled in the pin fixture 33 which is made of plastic. Although, the numbers of the pogo pins 32 are respectively two on the first side 331 and the second side 332 in this embodiment, the numbers of the pogo pins are not limited thereto. Additionally, the bases 321 of the pogo pins 32 on both the first side 331 and the second side 332 are disposed in reverse in the pin fixture 33, and the retractable pistons 322 are disposed in the fixing components 31. The elastic assembly 30 is connected to the main body 21 and the sliding cover 22 via the fixing components 31, and provides an anti-slip force F2 and a return force F3 between the main body 21 and the sliding cover 22. Further, the manufacturing process of the elastic assembly 30 is not limited to the described process and can be made by insert molding which binds the pogo pins 32 in the pin fixture 33.

Figure 4A:
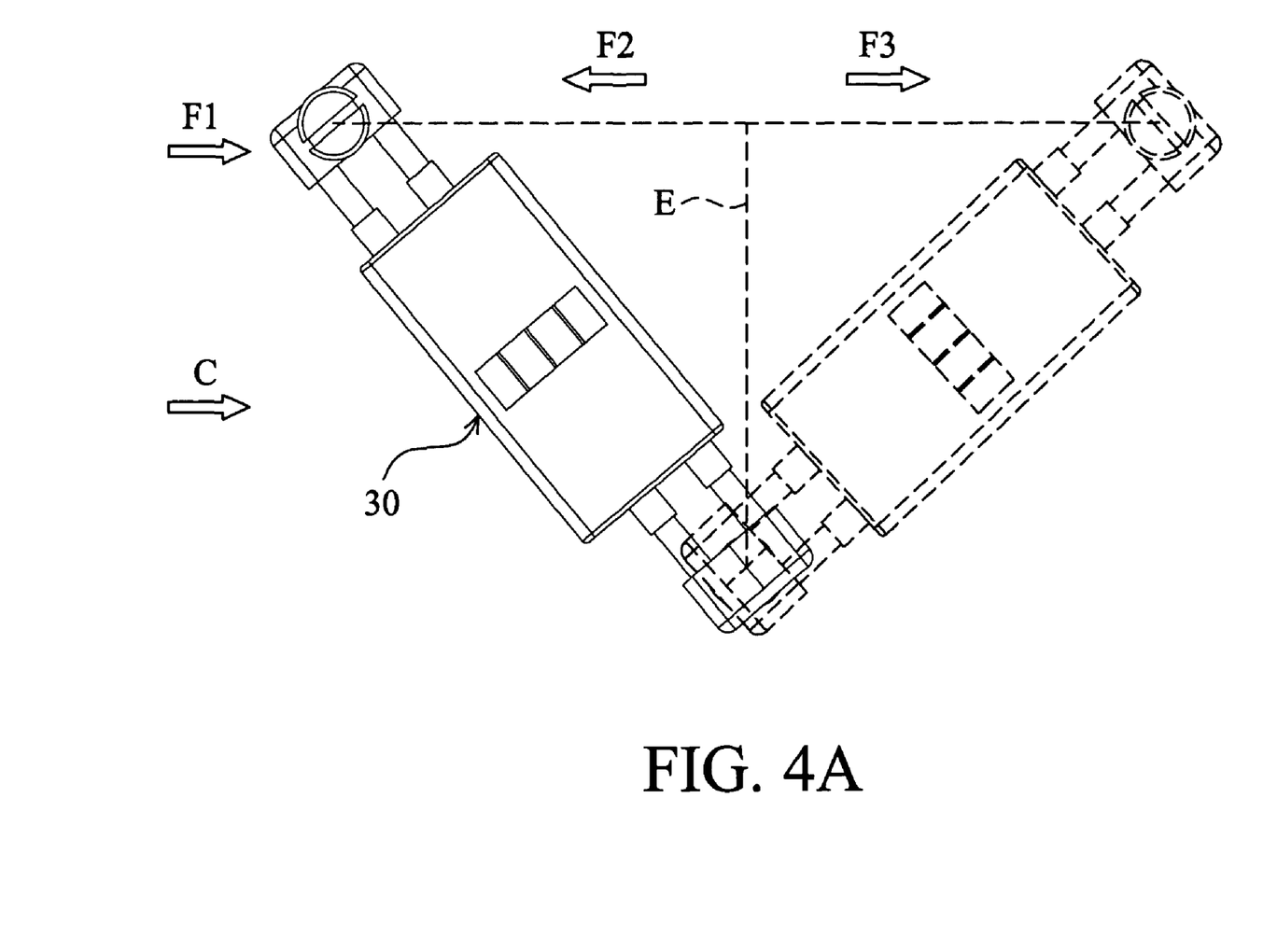
FIGS. 4A and 4B show applied forces on the elastic assembly.
Figure 4B:
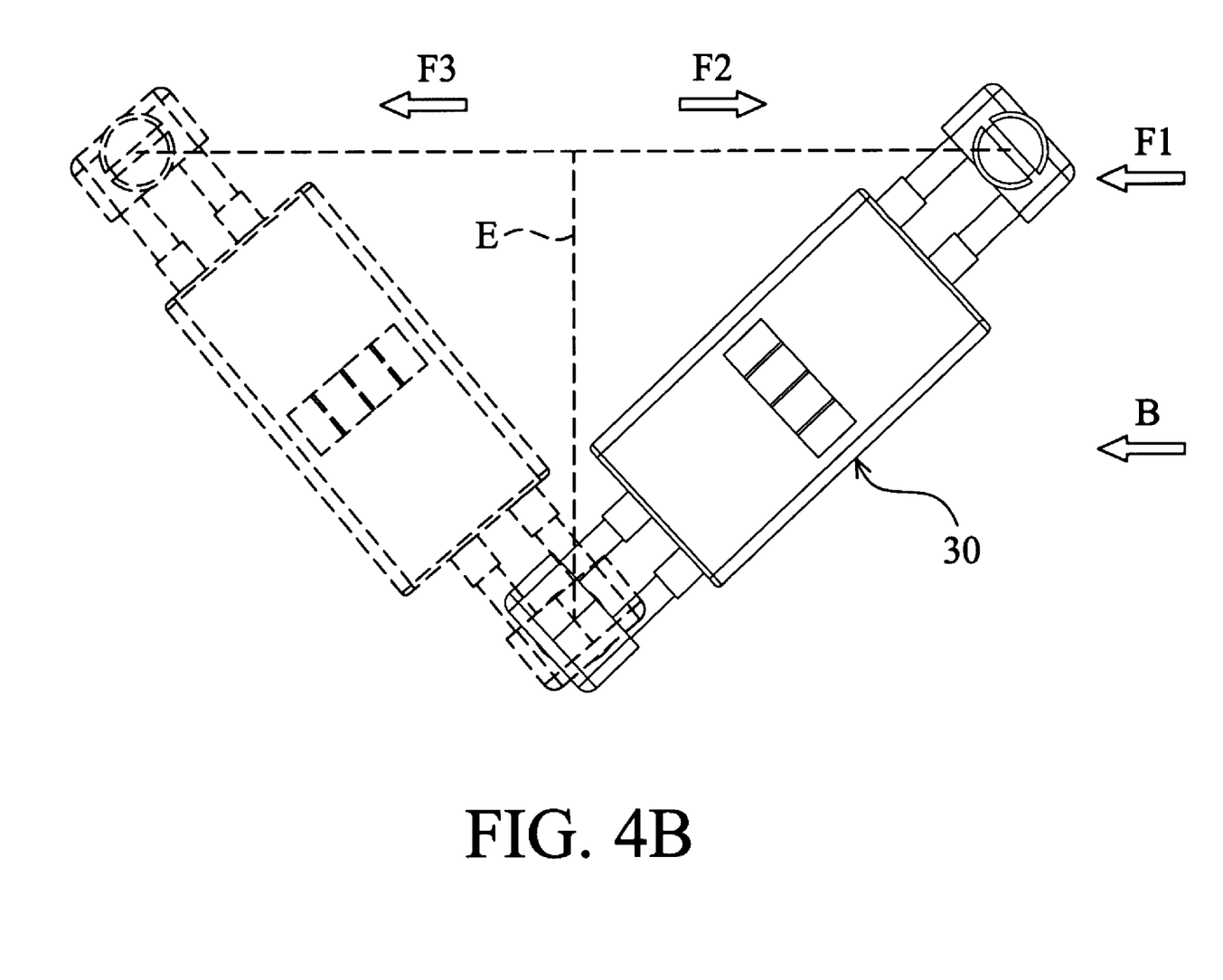

Referring to FIG. 4A and FIG. 4B, FIG. 4A and FIG. 4B show the force application on the elastic assembly 30, wherein the applied force F1 in FIG. 4A and the applied force F1 in FIG. 4B are in reverse direction and indicate respectively the different applied forces F1 for opening the sliding cover 22 (direction C) or closing the sliding cover 22 (direction B). When the sliding cover 22 is under the applied force F1, the sliding cover 22 is initially under a resistant anti-slip force F2 until the elastic assembly 30 passes over a center line E, wherein the anti-slip force F2 prevents unintentional movement of the sliding cover 22 at the full-open position or the closed position. The maximum resistant elastic force is provided when the elastic assembly 30 passes the center line E. After the elastic assembly 30 passes over the center line E, the elastic assembly 30 provides a return force F3 which drives the sliding cover 22 to automatically slide to the full-open position or the closed position.

Figure 5A:
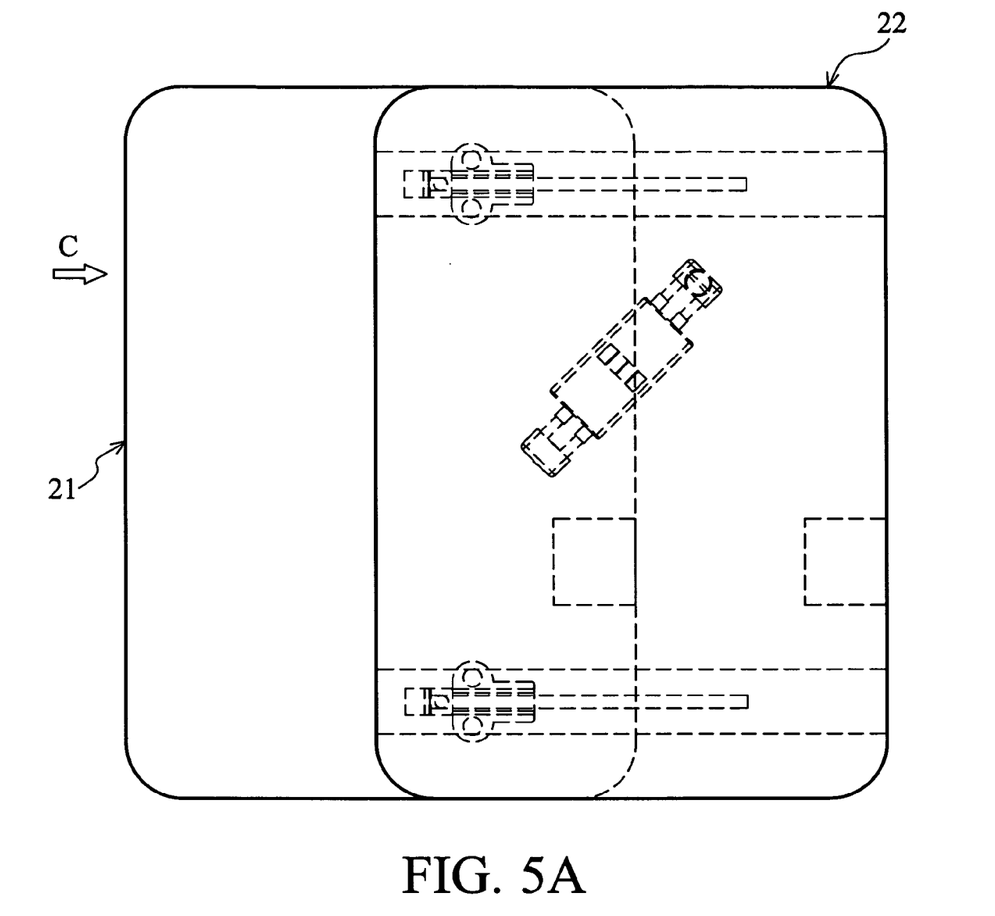
FIG. 5A is a top view of a sliding cover located at a full-open position on a main body.
Figure 5B:
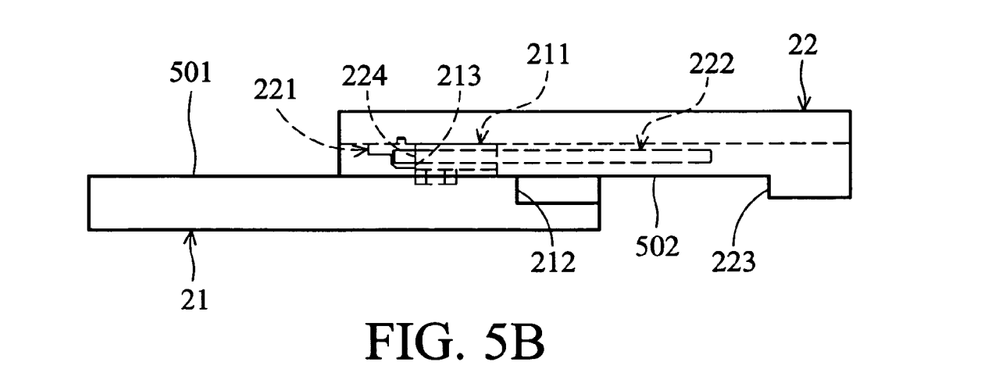
FIG. 5B is a side view of a sliding cover located at the full-open position on the main body.

Referring to FIG. 5A and FIG. 5B, FIG. 5A and FIG. 5B show the full-open position of the sliding cover 22 on the main body 21, the full-open position is a restraint position of the sliding cover 22 on the main body 21. When the applied force F1 is on the sliding cover 22 to drive the sliding cover 22 to slide in direction C, the sliding cover 22 is initially under the resistant anti-slip force F2 until the elastic assembly 30 passes over the center line E (see FIG. 4A). After the elastic assembly 30 passes the center line E, the sliding cover 22 is under the return force F3 which drives the sliding cover 22 to automatically slide to the full-open position on the main body 21. Meanwhile, the third restraint surface 213 on the sliding rod package 211 leans against the fourth restraint surface 224 on the fixing element 221 to define the full-open position of the sliding cover 22 on the main body 21, and the overlapping area between a first overlaying surface 501 on the main body 21 and a second overlaying surface 502 on the sliding cover 22 is a minimum, the exposure area of the first overlaying surface 501 is a maximum. The maximum exposure area of the first overlaying surface 501 and the exposure area of the second overlaying surface 502 are capable of accommodating elements such as a keypad, a screen display, or buttons.

Figure 6A:
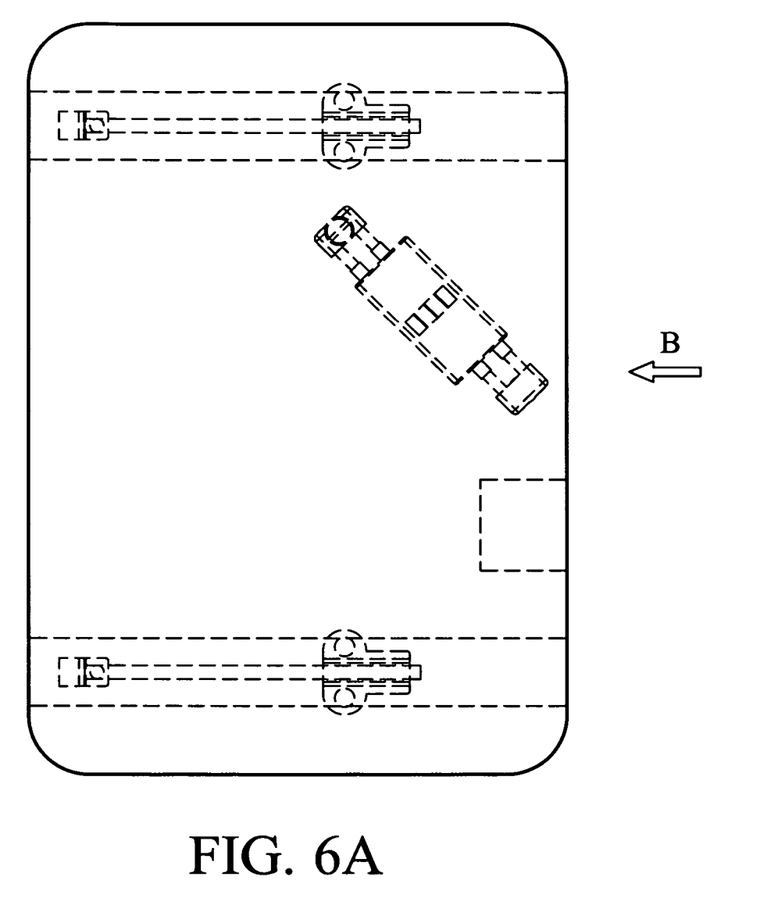
FIG. 6A is a top view of a sliding cover located at a closed position on the main body.
Figure 6B:
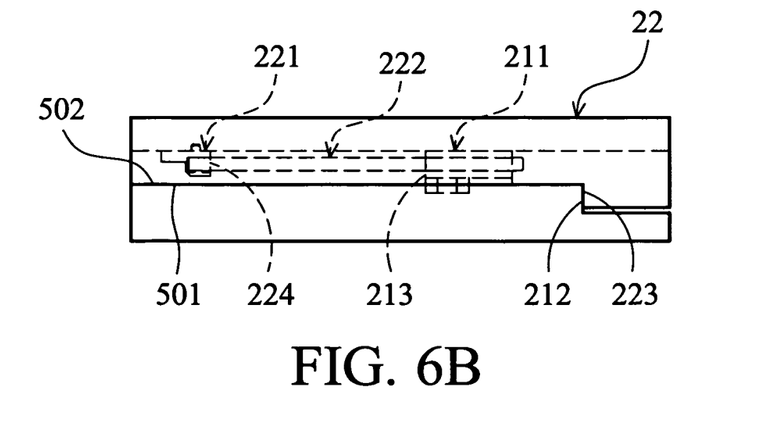
FIG. 6B is a side view of a sliding cover located at the closed position on the main body.

Referring the FIG. 6A and FIG. 6B, FIG. 6A and FIG. 6B show the closed position of the sliding cover 22 on the main body 21, the closed position is a restraint position of the sliding cover 22 on the main body 21. When the applied force F1 on the sliding cover 22 in direction B to drive the sliding cover 22 to move in direction B, the sliding cover 22 is initially under the resistant anti-slip force F2 until the elastic assembly 30 passes over the center line E (see FIG. 4B). After the elastic assembly 30 passing over the center line E, the sliding cover 22 is under the return force F3 which drives the sliding cover 22 to automatically slide to the closed position on the main body 21. Meanwhile, the overlapping area between the first overlaying surface 501 on the main body 21 and the second overlaying surface 502 on the sliding cover 22 is a maximum, the first restraint surface 212 on the main body 21 leans against the second restraint surface 223 on the sliding cover 22 to define the closed position of sliding cover 22 on the main body 21.

Figure 7:
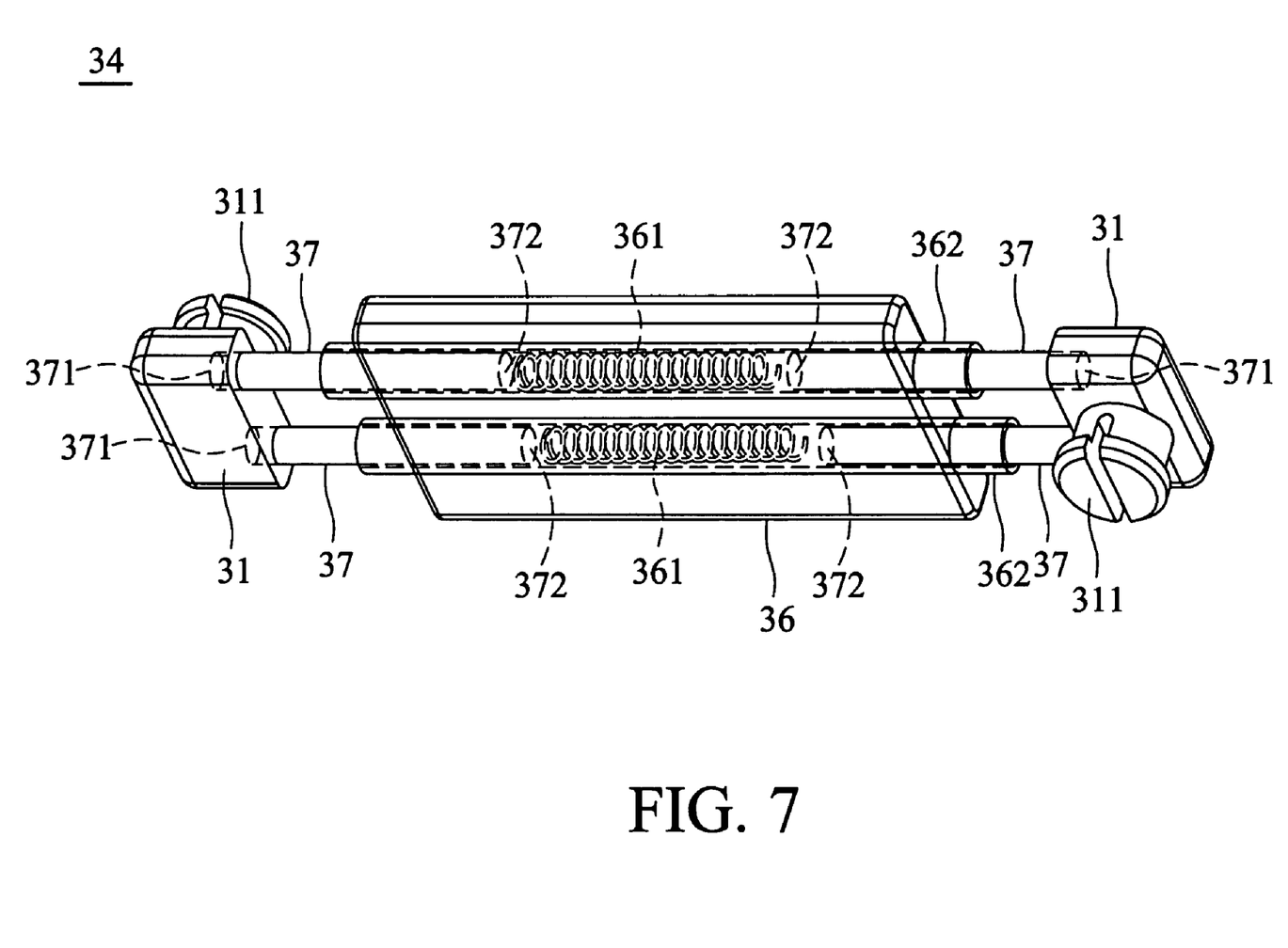
FIG. 7 is a perspective view of another embodiment of an elastic assembly.

FIG. 7 shows another embodiment of an elastic assembly 34, the elastic assembly 34 is connected to the main body 21 and the sliding cover 22, comprises two fixing components 31, a spring fixture 36, two spring sleeves 362, four linkages 37, and two springs 361, wherein the fixing components 31 comprise the fixing pins 311 via which the elastic assembly 34 is respectively pivotally connected to the main body 21 and the sliding cover 22. The linkages 37 comprise a plurality of first sidewalls 371 and a plurality of second sidewalls 372, wherein the first sidewalls 371 are mounted in the fixing component 31. The springs 361 are assembled in the spring fixture 36, and the two sides of the spring 361 respectively lean against the second sidewalls 372 of the two linkages 37, wherein the spring fixture 36 is made of plastic material. Although, there are two springs 361 and two corresponding spring sleeves 362 in the spring fixture 36 of the embodiment, the numbers of the springs 361 and the spring sleeves 362 are not limited to this embodiment. Additionally, the dispositions of the fixing components 31 on opposite sides of the spring fixture 36 are respectively on the main body 21 and the sliding cover 22 and the fixing pins 311 are mutually in opposite directions. The elastic assembly 34 is respectively connected to the main body 21 and the sliding cover 22 via the fixing components 31, provides the anti-slip force F2 and the return force F3 between the main body 21 and the sliding cover 22.

Thus, the distance between axes of two sliding rods of a portable electronic device of the invention is not limited by a span length of a conventional transmission mechanism; the portable electronic device can be applied to the sidekick-esque portable electronic device or a transmission mechanism with the big span length. Further, an elastic force of an elastic assembly is capable of assisting the positioning of a sliding cover, thus the problem of positioning deviation due to manually operation is solved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device comprising:
a main body comprising at least one sliding rod package;
a sliding cover disposed on the main body in a manner such that the sliding cover is slidable between a full-open position and a closed position, comprising at least one fixing element and at least one sliding rod which is slidably inserted into the sliding rod package; and
an elastic assembly connected to both the main body and the sliding cover to control the sliding cover at the closed position or the full-open position, comprising:
a pin fixture;
a plurality of fixing components comprising a plurality of fixing pins, wherein the fixing pins are disposed respectively on the main body and the sliding cover, and the pin fixture is connected in between the plurality of fixing components; and
a plurality of pogo pins comprising a plurality of bases and a plurality of retractable pistons, wherein the bases are fixed to the pin fixture and the retractable pistons are disposed in the fixing components.

2. The portable electronic device as claimed in claim 1, wherein the sliding rod package is made of a self-lubricating plastic.

3. The portable electronic device as claimed in claim 2, wherein the self-lubricating plastic comprises Polyoxymethylene.

4. The portable electronic device as claimed in claim 1, wherein the sliding rods are mutually parallel.

5. The portable electronic device as claimed in claim 1, wherein the sliding rods are made of stainless steel with high surface finish.

6. The portable electronic device as claimed in claim 1, wherein a sliding direction of the sliding cover on the main body is parallel to an axis direction of the sliding rod.

7. The portable electronic device as claimed in claim 1, wherein the main body comprises a first overlaying surface and the sliding cover comprises a second overlaying surface corresponding to the first overlaying surface, the first overlaying surface fully overlaps the second overlaying surface when the sliding cover slides to the closed position, an overlapping area between the first overlaying surface and the second overlaying surface is minimum when the sliding cover slides to the full-open position.

8. The portable electronic device as claimed in claim 1, wherein the main body comprises a first restraint surface and the sliding cover comprises a second restraint surface, the first restraint surface and the second restraint surface defines the closed position of the sliding cover.

9. The portable electronic device as claimed in claim 1, wherein the sliding rod package comprises a third restraint surface and the fixing element comprises a fourth restraint surface, the third restraint surface and the fourth restraint surface defines the full-open position of the sliding cover.

10. The portable electronic device as claimed in claim 1, wherein the portable electronic device is a sidekick-esque portable electronic device.

11. The portable electronic device as claimed in claim 1, wherein the portable electronic device is a smart phone, a personal digital assistant or a mobile phone.

12. A portable electronic device comprising:
a main body comprising at least one sliding rod package;
a sliding cover disposed on the main body in a manner such that the sliding cover is slidable between a full-open position and a closed position, comprising at least one fixing element and at least one sliding rod which is slidably inserted into the sliding rod package; and
an elastic assembly connected to both the main body and the sliding cover to control the sliding cover at the closed position or the full-open position, comprising:
a spring fixture;
at least one spring sleeve fixed in the spring fixture;
a plurality of fixing components comprising a plurality of fixing pins, wherein the fixing pins are disposed on the main body and the sliding cover, respectively, and the spring fixture is connected in between the plurality of fixing components;
a plurality of linkages comprising a plurality of first sidewalls and a plurality of second sidewalls, wherein the first sidewalls are mounted on the fixing components; and
at lease one spring disposed in the spring sleeve, comprising at least one side against the second sidewall.

13. The portable electronic device as claimed in claim 12, wherein the sliding rod package is made of a self-lubricating plastic.

14. The portable electronic device as claimed in claim 13, wherein the self-lubricating plastic comprises Polyoxymethylene.

15. The portable electronic device as claimed in claim 12, wherein the sliding rods are mutually parallel.

16. The portable electronic device as claimed in claim 12, wherein the sliding rods are made of stainless steel with high surface finish.

17. The portable electronic device as claimed in claim 12, wherein a sliding direction of the sliding cover on the main body is parallel to an axis direction of the sliding rod.

18. The portable electronic device as claimed in claim 12, wherein the main body comprises a first overlaying surface and the sliding cover comprises a second overlaying surface corresponding to the first overlaying surface, the first overlaying surface fully overlaps the second overlaying surface when the sliding cover slides to the closed position, an overlapping area between the first overlaying surface and the second overlaying surface is minimum when the sliding cover slides to the full-open position.

19. The portable electronic device as claimed in claim 12, wherein the main body comprises a first restraint surface and the sliding cover comprises a second restraint surface, the first restraint surface and the second restraint surface defines the closed position of the sliding cover.

20. The portable electronic device as claimed in claim 12, wherein the sliding rod package comprises a third restraint surface and the fixing element comprises a fourth restraint surface, the third restraint surface and the fourth restraint surface defines the full-open position of the sliding cover.

21. The portable electronic device as claimed in claim 12, wherein the portable electronic device is a sidekick-esque portable electronic device.

22. The portable electronic device as claimed in claim 12, wherein the portable electronic device is a smart phone, a personal digital assistant or a mobile phone.

* * * * *